Figure 2:
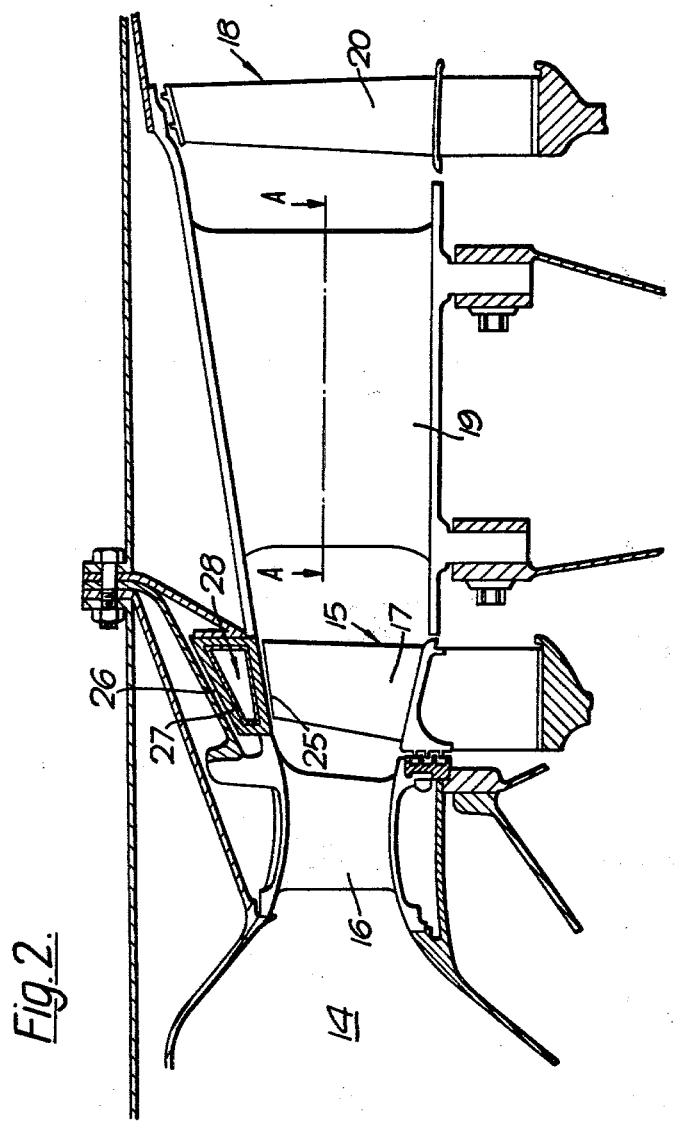

United States Patent [19]
Barry et al.

[11] 4,207,027
[45] Jun. 10, 1980

[54] TURBINE STATOR AEROFOIL BLADES FOR GAS TURBINE ENGINES

[75] Inventors: Brian Barry, Duffield, England; David W. Artt, Belfast, Northern Ireland; Susan M. Allen, Belper, England

[73] Assignee: Rolls-Royce Limited, London, England

[21] Appl. No.: 822,960

[22] Filed: Aug. 4, 1977

[30] Foreign Application Priority Data

Aug. 12, 1976 [GB] United Kingdom ............... 33550/76

[51] Int. Cl.² .............................................. F01D 5/18
[52] U.S. Cl. .................................. 416/96 R; 415/115; 165/105
[58] Field of Search ............... 415/114, 115, 116, 117; 416/96 R, 96 A, 97 R, 97 A

[56] References Cited

U.S. PATENT DOCUMENTS

| | | | |
|---|---|---|---|
| 2,744,723 | 5/1956 | Roush | 415/114 |
| 3,287,906 | 11/1966 | McCormick | 416/96 R |
| 3,334,685 | 8/1967 | Burggraf et al. | 416/96 R |
| 4,019,571 | 4/1977 | Kosson et al. | 165/105 |
| 4,108,239 | 8/1978 | Fries | 165/105 |

OTHER PUBLICATIONS

Francis W. Sears, Mechanics, Heat and Sound, 1950, pp. 325–329.
Feldman et al., "The Heat Pipe", Mechanical Engineering, Feb. 1967, vol. 89, No. 2, pp. 30–33.

Primary Examiner—Stephen C. Bentley
Attorney, Agent, or Firm—Cushman, Darby & Cushman

[57] ABSTRACT

A stator aerofoil blade for a gas turbine engine is manufactured in the form of a heat pipe so that during engine operation, the blade remains substantially isothermal. Localized thermal gradients within the blade are minimized thereby reducing the possibility of blade distortion or cracking.

A shroud ring for a gas turbine engine is manufactured in the form of a heat pipe so that during engine operation, the ring remains substantially isothermal. Localized thermal gradients within the ring are minimized, thereby reducing the possibility of ring distortion occurring.

7 Claims, 3 Drawing Figures

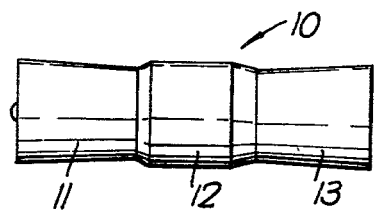
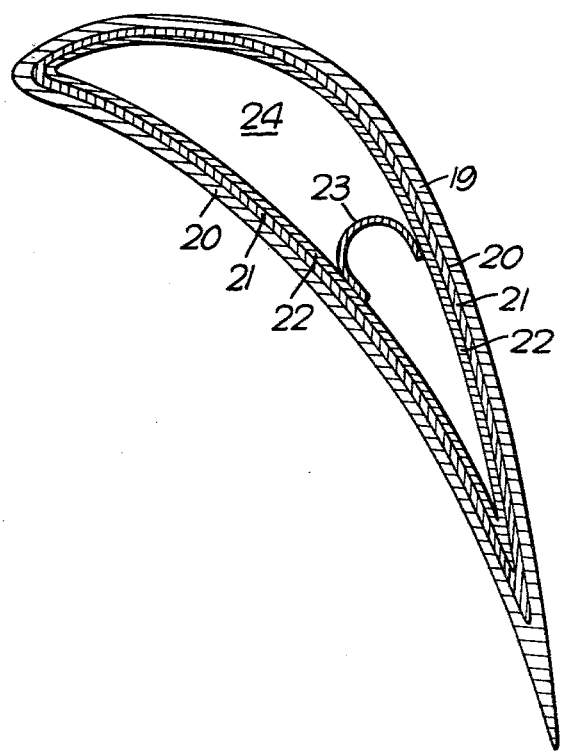

TURBINE STATOR AEROFOIL BLADES FOR GAS TURBINE ENGINES

This invention relates to gas turbine engines and in particular to the turbines of such engines.

In the pursuit of better gas turbine engine specific fuel consumption, higher bypass ratios have been utilised which have in turn led to increased power from the gas generator. However this increased gas generator power has resulted in higher turbine entry temperatures. Whilst such increased temperatures are desirable from the point of view of engine efficiency, it has been increasingly difficult to provide turbine components which will withstand such temperatures over long periods of time without suffering some kind of structural failure. In particular, severe problems have been encountered with turbine components which are subjected in use to localised thermal gradients. This results in thermal stress being induced in those components which in turn can cause their distortion or cracking.

Thermal gradients are a particular problem in the case of turbine nozzle guide vanes and shroud rings. As the result of uneven combustion chamber traverse and turbulence, nozzle guide vanes are subjected to temperature variations over their aerofoil surfaces which can be as much as 200° C. This induces thermal stress in the guide vanes which can in turn lead to cracking of their aerofoil portions. Shroud rings can vary in temperature in an axial direction by as much as 300° C. This often results in the distortion of the shroud ring, thereby causing sealing problems with the rotating turbine blades with which it cooperates.

It is an object of the present invention to provide a turbine stator aerofoil blade in which such temperature variations are minimised.

It is a further object of the present invention to provide a shroud ring for a gas turbine engine in which such temperature variations are minimised.

According to one aspect of the present invention a turbine stator aerofoil blade is provided with at least one portion which is in the form of a heat pipe, said at least one portion being wholly located within said aerofoil blade such that when said aerofoil blade is positioned within the turbine of a gas turbine engine, substantially the whole of said heat pipe is exposed to the single hot gas stream which passes through said turbine during engine operation.

Said at least one portion may be the aerofoil section portion of said aerofoil blade.

Throughout this specification, the term "heat pipe" is to be understood as meaning a heat transfer device comprising a sealed container which encloses both a condensable vapour and capillary means capable of causing the transport of the condensed vapour from a cooler area of the container to a hotter area, the condensable vapour being transported from the hotter area to the cooler area by the vapour pressure gradient between the two areas, the vapour being condensed in the cooler area.

The variation of vapour pressure with temperature of such substances as water, ammonia, mercury, caesium, potassium, sodium, lithium and lead is such that a change in temperature of only 1° or 2° C. gives a very large change in their vapour pressure. Consequently the temperature differences occurring over the length of a heat pipe containing one of these substances as the condensable vapour are so small as to render the heat pipe substantially isothermal. In practice, the effective thermal conductivity of a heat pipe can be as much as 500 times greater than that of a solid copper rod having the same mass. The principles behind heat pipes are more thoroughly set out in "Structures of Very High Thermal Conductance" Grover, Cotter and Erickson, Journal of Applied Physics Vol. 35, 1990 (June 1964).

The condensable vapour enclosed within said turbine stator aerofoil blade is preferably sodium.

This is because sodium has:
(a) a high surface tension to provide satisfactory capillary pumping,
(b) good wetting characteristics with the capillary means again as a result of its high surface tension,
(c) low viscosity to aid pumping of the liquid sodium along the capillary means,
(d) high latent heat of vapourisation to aid heat transfer,
(e) high thermal conductivity to aid heat transfer between the liquid sodium, the stationary element wall and the capillary means,
(f) freezing and boiling points compatible with the temperature ranges likely to be encountered in the turbine of a gas turbine engine,
(g) high vapour density to reduce flow resistance,
(h) compatibility with the metals commonly used in the manufacture of stationary turbine elements, and
(i) chemical stability.

The capillary means enclosed within said aerofoil blade is preferably formed from stainless steel mesh.

Said stainless steel mesh may be formed in two layers: a first layer adjacent the internal walls of said aerofoil blade and a second layer adjacent said first layer, said first layer being of a coarser mesh than that of said second layer.

Said aerofoil blade may comprise a nozzle guide vane.

Said nozzle guide vane may constitute one of an annular array of similar such guide vanes.

According to a further aspect of the present invention a shroud ring for a gas turbine engine is hollow so as to comprise a sealed annular chamber, said chamber containing a condensable vapour and provided with capillary means its internal surfaces so that said shroud ring is in the form of a heat pipe.

The invention will now be described, by way of example, with reference to the accompanying drawings in which:

FIG. 1 is a side elevation of a gas turbine engine in accordance with the present invention, FIG. 2 is a partially sectioned side elevation of part of the turbine of the gas turbine engine shown in FIG. 1, and FIG. 3 is a view on the section line A—A in FIG. 2.

With reference to FIG. 1, a gas turbine engine generally shown at 10 consists of a compressor 11, combustion equipment 12 and a turbine 13. The gas turbine engine 10 operates in the conventional manner, that is, air compressed by the compressor 11 is mixed with fuel and combusted in the combustion equipment 12. The resultant hot gases expand through the turbine 13 to atmosphere, thereby driving the turbine 13 which in turn drives the compressor 11.

The combustion equipment 12 comprises an annular combustion chamber 14, a portion of the downstream end of which can be seen in FIG. 2. Hot gases from the combustion chamber 14 are directed into the high pressure section 15 of the turbine 13 by an annular array of stationary nozzle guide vanes, one of which can be seen at 16. In this particular case, the high pressure turbine 15 consists of a single stage of rotatably mounted turbine blades, one of which can be seen at 17. The high pressure turbine 15 is drivingly connected by a suitable shaft (not shown) to the high pressure portion of the compressor 11.

The hot gases issued from the high pressure turbine 15 are then directed into the low pressure turbine 18 by a second annular array of stationary nozzle guide vanes one of which can be seen at 19. As in the case of the high pressure turbine 15, the low pressure turbine 18 consists of a single stage of rotatably mounted turbine blades, one of which can be seen at 20. The low pressure turbine 18 is drivingly connected by a further suitable shaft (not shown) to the low pressure portion of the compressor 11. The hot gases issued from the low pressure turbine 18 then pass through an annular array of outlet guide vanes (not shown) before being exhausted to atmosphere.

The low pressure nozzle guide vane 19 which is manufactured from a nickel base alloy, is hollow as can be more easily seen in FIG. 3. The internal wall 20 of the aerofoil portion of the nozzle guide vane 19 has a stainless steel mesh 21 spot welded thereto. The stainless steel mesh 21 is what is known as 60 mesh i.e. the mesh wire diameters are 0.006 inches. The stainless steel mesh 21 has in turn a second stainless steel mesh 22 spot welded thereto. The second stainless steel mesh 22 is what is known as 100 mesh i.e. the wire diameters are 0.004 inches. Thus the internal wall 20 of the aerofoil portion of the nozzle guide vane 19 is provided with two layers of stainless steel mesh, the layer 21 adjacent the internal wall 20 being of a coarser mesh than that of the outer layer 22.

A strip 23 of 100 mesh stainless steel mesh of U-shaped cross-section interconnects opposite section of the second stainless steel mesh 22 across the mid portion of the nozzle guide vane 19.

The hollow interior 24 of the aerofoil portion of the nozzle guide vane 19 is a vacuum and contains a small amount of sodium. Consequently the nozzle guide vane 19 is in the form of a heat pipe (as hereinbefore defined).

In operation, the hot gases issued from the high pressure turbine 17 impinge upon the low pressure nozzle guide vanes 19 in such a manner that each guide vane 19 has regions on its aerofoil surface which are of differing temperatures. The heating up of the nozzle guide vanes 19 results in the melting and subsequent vapourisation of the sodium contained within them. Sodium vapourised in the hotter regions of the nozzle guide vanes 19 is transported by vapour pressure differences to the cooler regions where it condenses. Thus the heat required to vapourise the sodium is extracted from those hotter regions and is utilised in heating up the cooler regions upon the condensation in those cooler regions of the sodium vapour. After condensation, the liquid sodium is pumped by capillary action through the stainless steel meshes 21 and 22 back to the hotter regions where the cycle is repeated. Thus by the constant vapourisation and condensation of the sodium, each of the nozzle guide vanes 19 assumes a substantially even temperature distribution i.e. each becomes substantially isothermal. The stainless steel mesh strip 23 provides and arterial liquid sodium feed between the high and low pressure portions of the aerofoil section of the nozzle guide vane 19.

We have found that by using a two layer stainless steel mesh, more efficient transport of the liquid sodium occurs. Thus the coarse mesh 21 adjacent the internal wall 20 results in reduced flow resistance of the liquid whilst the fine mesh 22 ensures large capillary pumping forces.

A nozzle guide vane similar to that 19 described above was asymmetrically heated with an induction coil so as to simulate the temperature conditions a nozzle guide vane is likely to encounter during engine operation. Measurements with an optical pyrometer showed that the average temperature of the pressure surface of the nozzle guide vane was 650° C. whilst that on the suction side was 670° C. This compares with temperature differences averaging at 60° C. and peaking at 200° C. with conventional air cooled low pressure nozzle guide vanes.

In order to ensure that as much of the hot gases directed by the high pressure nozzle guide vanes 16 pass over the aerofoil portions of the high pressure turbine blades 17, the tips 25 of the turbine blades 17 are arranged to pass as closely as possible to an annular shroud ring 26 (FIG. 2).

The shroud ring 26 is hollow so as to comprise a sealed annular chamber 28 and is provided with a double layer of stainless steel mesh 27 on its internal surfaces in a similar fashion to that described above in relation to the low pressure nozzle guide vane 19. The chamber 28 is a vacuum and contains a small amount of sodium. The shroud ring 26 is thus in the form of a heat pipe which functions in the manner described previously.

Since the shroud ring 26 is a heat pipe, it remains substantially isothermal during engine operation. Consequently although a thermal gradient occurs across the face of the shroud ring 26 adjacent the blade tips 25 as the result of work being extracted from the combustion gases passing through the high pressure turbine 15, the substantially isothermal properties of the shroud ring 26 minimise that gradient. Now in the past the use of solid shroud rings has meant that the tip clearance of the turbine blades 17 has had to be sufficiently large to take into account the shroud ring distortion which occurs as the result of the thermal gradient across the shroud ring. By utilising a shroud ring 26 in the form of a heat pipe, distortion is substantially reduced as the result of its isothermal properties. Consequently smaller tip clearances are possible, thereby improving engine efficiency.

Although the present invention has been described with reference to a nozzle guide vane having its aerofoil section portion in the form of a heat pipe, it will be understood that other protions could also be is such a form. Thus, for instance, the radially inner and outer shrouds of a nozzle guide vane could be in the form of heat pipes.

It will also be appreciated that whilst the present invention has been described with reference to heat pipes provided with capillary means in the form of stainless steel mesh, other materials may be utilised. Thus, for instance, the capillary means could be manufactured from porous glass, metal or ceramic.

We claim:

1. A turbine stator aerofoil blade having at least one portion thereof in the form of a heat pipe located entirely within the aerofoil blade,
   said blade including an inner portion thereof having attached thereto a porous capillary means having relatively large openings therein, adjacent thereto a second porous capillary layer having relatively smaller openings therein, and a porous capillary layer across about the mid-portion of said blade interconnecting the opposing said second layer surfaces, said heat pipe including a sealed container enclosing a condensible vapor, and said porous capillary means for transporting the condensed vapor from a cooler area to a hotter area by a vapor pressure gradient established between the cooler area and the hotter area, the vapor being condensed in the cooler area, such that, in operation, the hot gases impinge upon said blade resulting in the melting and subsequent vaporization of the condensible vapor contained therein, the material so vaporized being transported by vapor pressure differences to the cooler regions where it condenses, and after condensation the liquid material is pumped by capillary action through said porous layers back to the hotter regions such that a substantially isothermal temperature distribution is maintained.

2. The turbine stator blade as claimed in claim 1 wherein said condensible vapor is sodium and said capillary means enclosed within the aerofoil blade are formed of wire mesh.

3. A turbine stator aerofoil blade as claimed in claim 1 wherein the condensable vapour enclosed within said aerofoil blade is sodium.

4. A turbine stator aerofoil blade as claimed in claim 3 wherein the capillary means enclosed within said aerofoil blade is formed from stainless steel mesh.

5. A turbine stator aerofoil blade as claimed in claim 4 wherein said capillary means is formed in two layers; a first layer adjacent the internal walls of said aerofoil blade and a second layer adjacent said first layer, said first layer being of a coarser mesh than that of said second layer.

6. A turbine stator aerofoil blade as claimed in claim 1 wherein said aerofoil blade is a nozzle guide vane.

7. A turbine stator aerofoil blade having at least one portion thereof in the form of a heat pipe located entirely within the aerofoil blade, said blade including an inner portion thereof having attached thereto a mesh capillary means having relatively large openings therein, adjacent thereto a second mesh capillary layer of relatively smaller openings therein, and a mesh capillary layer attached to and interconnecting the opposing surfaces of said second mesh layer, said heat pipe including a sealed container enclosing sodium, a condensible vapor, and said mesh capillary means for transporting the condensed vapor from a cooler area to a hotter area by a vapor pressure gradient established between the cooler area and the hotter area, the vapor being condensed in the cooler area, such that, in operation, the hot gases impinge upon said blade resulting in the melting and subsequent vaporization of the sodium contained therein, the sodium so vaporized being transported by vapor pressure differences to the cooler regions where it condenses, and after condensation the liquid sodium is pumped by capillary action through said mesh layers back to the hotter regions such that a substantially isothermal temperature distribution is maintained.

* * * * *